United States Patent [19]

Lowrie

[11] 3,843,657
[45] Oct. 22, 1974

[54] 9-DIALKYLAMINOALKYL-N-SUBSTITUTED FLUORENE-9-CARBOXAMIDES

[75] Inventor: Harman S. Lowrie, Glenview, Ill.

[73] Assignee: G. D. Searle & Co., Chicago, Ill.

[22] Filed: Dec. 8, 1972

[21] Appl. No.: 313,357

[52] U.S. Cl. ...... 260/268 TR, 260/558 A, 424/324, 424/250
[51] Int. Cl. ..................... C07c 103/28, C07d 51/70
[58] Field of Search ........................... 260/558, 268

[56] References Cited
UNITED STATES PATENTS
3,660,485  5/1972  Cusic et al. ........................ 260/558

Primary Examiner—Harry I. Moatz
Attorney, Agent, or Firm—John M. Brown

[57]  ABSTRACT

The present invention is concerned with 9-dialkylaminoalkyl-N-substituted-fluorene-9-carboxamides. These compounds are prepared by contacting fluorene-9-carboxylic acid chloride with an appropriate diamine to form the corresponding amide, then reacting that with an appropriate dialkylaminoalkylhalide in the presence of base to form the 9-dialkylaminoalkyl-N-substituted-fluorene-9-carboxamides. The compounds of the present invention are useful as anti-bacterial and anti-fungal agents.

4 Claims, No Drawings

9-DIALKYLAMINOALKYL-N-SUBSTITUTED FLUORENE-9-CARBOXAMIDES

The present invention relates to 9-dialylaminoalkyl-N-substituted-fluorene-9-carboxamides of the formula

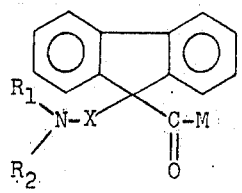

wherein $R_1$ and $R_2$ are lower alkyl or benzyl radicals, X is an alkylene radical containing 1 to 7 carbon atoms, and M is a diamine radical of the formula

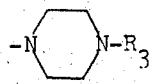

or

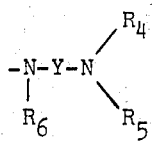

in which $R_3$, $R_4$, or $R_5$, are lower alkyl radicals, $R_6$ is a lower alkyl or benzyl radical, and Y is an alkylene radical containing 1 to 7 carbon atoms.

The lower alkyl radicals include methyl, ethyl, isopropyl, butyl, pentyl, hexyl and heptyl of which methyl and ethyl are preferred. The preferred alkylene radical is ethylene.

The organic bases of this invention form pharmaceutically acceptable salts with a variety of inorganic and strong organic acids. Such salts are formed with acids such as sulfuric, phosphoric, hydrochloric, hydrobromic, hydriodic, sulfamic, citric, lactic, maleic, malic, oxalic, succinic, tartaric, cinnamic, acetic, benzoic, gluconic, ascorbic, and related acids.

The compounds of the present invention are prepared by contacting fluorene-9-carboxylic acid chloride with a given diamine to form the corresponding amide. The resulting amide is reacted with an appropriate dialkylaminoalkyl halide in the presence of base to form the 9-dialkylaminoalkyl-9-carboxamide derivatives of fluorene. Accordingly, fluorene-9-carboxylic acid chloride is reacted with 4-methylpiperazine to form 9-(4-methylpiperazinocarbonyl)fluorene and the latter is reacted with 2-diethylaminoethyl chloride in the presence of potassium hydroxide to form 9-(4-methylpiperazinocarbonyl)-9-(2-diethylaminoethyl)-fluorene.

The compounds to which this invention relates are useful by reason of their valuable biological properties. Thus, for example, they are anti-bacterial, and anti-fungal agents.

The anti-bacterial utility of the instant compounds is evident from the results of standardized tests for their capacity to prevent the growth of *Bacillus subtilis*, *Salmonella paratyphi* A. In these tests, nutrient broth (manufactured by Baltimore biological Laboratories of Difco) is prepared at twice the concentration recommended by the manufacturer, sterilized, and inoculated with 2 percent (by volume) of a culture of *B. subtilis* or *S. parathyphi* A. Meanwhile, compound is heated in sterile distilled water at a concentration of 2000γ per ml. and a temperature of 80°C. for 20 min. An equivolume mixture of this compound preparation and the inoculated broth is incubated aerobically at 37°C. and then examined grossly for growth of the test organism. The incubation period is 20–24 hr. If growth of the test organism is observed, the compound is considered inactive. If no such growth is observed, the incubated mixture is serially diluted and mixed with an inoculated broth of the same composition as before excepting that the concentration is halved and 1 percent (by volume) of the culture instead of 2 percent is incorporated. Amounts of the latter broth added are such that concentrations of 100, 10, and 1 γ of compound per ml. result. The mixtures thus obtained are incubated as before and then examined grossly for growth of the test organism. Potency is expressed as the minimum concentration at which no growth of test organism is discernible. Controls are provided by concurrent incubations identical with the foregoing except for the absence of compound.

The anti-fungal activity of the instant compounds is evident from the results of standardized tests for their capacity to prevent the growth of Trichophyton mentagrophytes. In these tests, two concentrations of Sabouraud dextrose agar (manufactured by Baltimore Biological Laboratories of Difco) are prepared, one as recommended by the manufacturer and the other at twice this concentration. These preparations are sterilized and then maintained in a fluid state at 80°C. Meanwhile, compound is heated in sterile distilled water at a concentration of 2,000 γ per ml. and a temperature of 80°C. for 20 min. An equivolume mixture of this preparation and the double strength agar is serially diluted and mixed with the single strength agar in amounts such that concentrations 1,000, 100, 10, and 1 γ of test compound per ml. result. The mixtures thus obtained are allowed to cool and solidify, whereupon they are surface-inoculated with a suspension of *T. mentagrophytes* and then incubated aerobically at room temperature for 6–7 days. Activity is determined by gross examination, and potency is expressed as the minimum concentration at which no growth of the test organism is discernible. Controls are provided by concurrent incubations identical with the foregoing except for the absence of compound.

The following examples are presented to further illustrate the present invention; they should not be construed as limiting it in spirit or in scope. In these examples, quantities are indicated in parts by weight unless otherwise indicated and temperatures in degrees Centigrade (°C.).

EXAMPLE 1

9-(4-Methylpiperazinocarbonyl)fluorene, melting at 131°–134.5°, is prepared by reacting 21 parts of fluorene-9-carboxylic acid chloride in 100 parts by volume of dry benzene containing 10 parts of triethylamine with 10 parts of N-methylpiperazine.

10.3 Parts of 9-(4-methylpiperazinocarbonyl)=fluorene, 3.0 parts of potassium hydroxide, and 4.9 parts of diethylaminoethylchloride are mixed in 400 parts by volume of methyl ethyl ketone. The reaction mixture is filtered and the solvent is evaporated at reduced pressure. The residue is suspended in benzene, extracted with dilute hydrochloric acid, and the hydrochloric acid extracts are made basic with sodium hydroxide. The organic base is extracted from the sodium hydroxide solution with ether, the ether extracts are washed with water and with saturated sodium chloride solution, then filtered through anhydrous potassium carbonate and the solvent evaporated. The product is 9-(4-methylpiperazinocarbonyl)-9-(2-diethylaminoethyl)-fluorene. The oxalic acid salt melts at 112°–122°. The formula of this free amine is

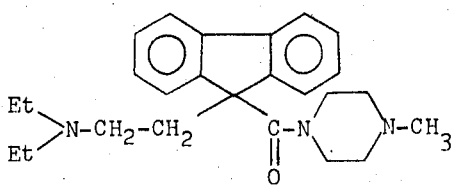

EXAMPLE 2

9-(4-Methylpiperazinocarbonyl)fluorene, melting at 131°–134.5°, is prepared as is described in Example 1. 10.3 Parts of 9-(4-methylpiperazinocarbonyl)fluorene, 3.0 parts of potassium hydroxide, and 4.9 parts of N-methyl-N-β-chloroethylbenzylamine hydrochloride are mixed in 400 parts by volume of methyl ethyl ketone. The reaction mixture is stirred, refluxed for six hours, and cooled. The reaction mixture is then filtered and the solvent is evaporated at reduced pressure. The residue is suspended in benzene and extracted with dilute hydrochloric acid and the hydrochloric acid extracts are made basic with sodium hydroxide. The organic base is extracted from the sodium hydroxide solution with ether and the ether extracts are washed with water and with saturated sodium chloride solution and then filtered through anhydrous potassium carbonate and the solvent evaporated. The ether is removed and the product is 9-(4-methylpiperacarbonyl)-9-N-benzyl-2-methylaminoethyl)fluorene. The oxalic acid salt melts at 205°–206°. The formula of the free amine is

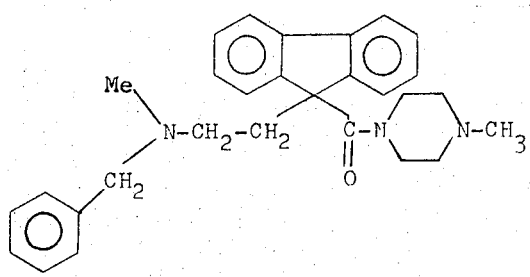

EXAMPLE 3

N-Methyl-N′, N′-dimethylaminomethylfluorene-9-carboxamide, melting at 203°–207°, is prepared by reacting 9.2 parts of fluorene-9-carboxylic acid chloride in 25 parts by volume of carbon tetrachloride with 4 parts of N-methyl-N′, N′-dimethylamine and 6 parts of triethylamine in 20 parts by volume of dichloromethane.

10.0 Parts of N-methyl-N,N′-dimethylaminoethyl=fluorene-9-carboxamide, 3.0 parts of potassium hydroxide, and 4.9 parts of diethylaminoethylchloride are suspended in 400 parts by volume of methyl ethyl ketone, stirred, and heated for 60 hours. The reaction mixture is filtered and the solvent is evaporated at reduced pressure. The residue is suspended in benzene and extracted with dilute hydrochloric acid and the hydrochloric acid extracts are made basic with sodium hydroxide. The organic base is extracted from the sodium hydroxide solution with ether and the ether extracts are washed with water and with saturated sodium chloride solution and then filtered through anhydrous potassium carbonate. The solvent is evaporated to provide 9-(2-diethylaminoethyl)-N-methyl-2-dimethylaminoethylfluorene-9-carboxamide, boiling at 200°–220°/0.3 mm. The formula is

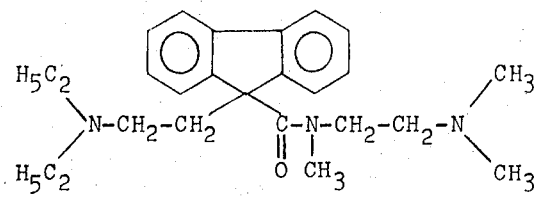

EXAMPLE 4

N-Benzyl-N′,N′-dimethylaminomethylflourene-9-carboxamide is prepared as is described in Example 3. 10.0 Parts of N-benzyl-N′,N′-dimethylaminoethylfluorene-9-carboxamide, 3.0 parts of potassium hydroxide, and 4.9 parts of diisopropylaminoethyl chloride are suspended in 400 parts by volume of methyl ethyl ketone, stirred and heated for 60 hours. The reaction mixture is filtered and the solvent is evaporated at reduced pressure. The residue is dissolved in benzene and extracted with dilute hydrochloric acid and the hydrochloric acid extracts are made basic with sodium hydroxide. The organic base is extracted from the sodium hydroxide solution with ether and the ether extracts are washed with water and with saturated sodium chloride solution and then filtered through anhydrous potassium carbonate. The solvent is evaporated to provide 9-(2-diisopropylaminoethyl)-N-benzyl-2-dimethylaminoethylfluorene -9-carboxamide. The formula is

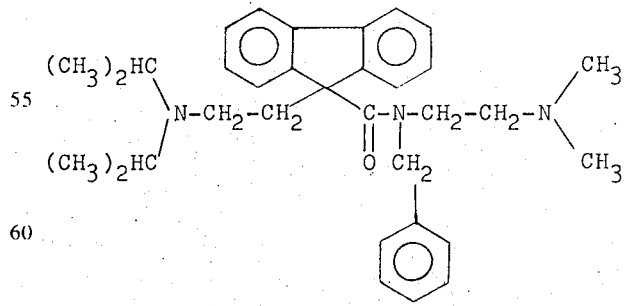

EXAMPLE 5

N-methyl-3-di-n-butylaminopropylfluorene-9-carboxamide is prepared by reacting 12 parts of fluorene-9-carboxylic acid chloride in 25 parts by volume of carbontetrachloride with 6 parts of N-methyl-N', N'-di-n-butyl-1,3-propanediamine and 7 parts of triethylamine in 20 parts by volume of dichloromethane.

10.0 Parts of N-methyl-3-di-n-butylaminopropyl=fluorene-9-carboxamide, 3.0 parts of potassium hydroxide, and 4.9 parts of diisopropylaminopropyl chloride are suspended in 400 parts by volume of methyl ethyl ketone, stirred and heated for 60 hours. The reaction mixture is filtered and the solvent is evaporated at reduced pressure. The residue is dissolved in benzene and extracted with dilute hydrochloric acid and the hydrochloride acid extracts are made basic with sodium hydroxide. The organic base is extracted from the sodium hydroxide solution with ether and the ether extracts are washed with ether and with saturated sodium chloride solution and then filtered through anhydrous potassium carbonate. The solvent is evaporated to provide 9-(3-diisoproaminopropyl)-N-ethyl-3-di-n-butylaminopropylfluorene-9-carboxamide. The formula is

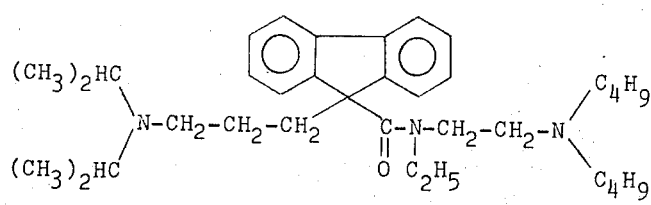

What is claimed is:

1. A compound of the formula

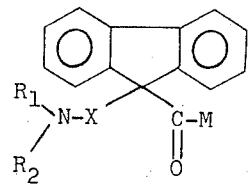

wherein $R_1$ and $R_2$ are lower alkyl or benzyl radicals, X is an alkylene radical containing 1 to 7 carbons, and M is a diamine radical of the formula:

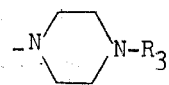

or

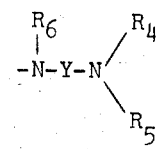

in which $R_3$, $R_4$ and $R_5$ are lower alkyl radicals, $R_6$ is an alkyl or benzyl radical, and Y is an alkylene radical containing 1–7 carbons.

2. According to claim 1, the compound which is 9-(4-methylpiperazinocarbonyl)-9-(N-benzyl-2-methylamino=ethyl)fluorene.

3. According to claim 1, the compound which is 9-(4-methylpiperazinocarbonyl)-9-(2-diethylaminoethyl)=fluorene.

4. According to claim 1, the compound which is 9-(2-diethylaminoethyl)-N-methyl-2-dimethylamino=ethylfluorene-9-carboxamide.

* * * * *